United States Patent
Choi et al.

(10) Patent No.: US 9,792,883 B2
(45) Date of Patent: *Oct. 17, 2017

(54) APPARATUS AND METHOD FOR COMPOSITING IMAGE IN A PORTABLE TERMINAL

(71) Applicant: Samsung Electronics Co., Ltd., Gyeonggi-do (KR)

(72) Inventors: Yoon-Hee Choi, Gyeonggi-do (KR); Hee-Seon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,636

(22) Filed: Jul. 8, 2016

(65) Prior Publication Data
US 2016/0322030 A1 Nov. 3, 2016

Related U.S. Application Data

(63) Continuation of application No. 13/450,054, filed on Apr. 18, 2012, now Pat. No. 9,398,251.

(30) Foreign Application Priority Data

Apr. 19, 2011 (KR) .................. 10-2011-0036031

(51) Int. Cl.
*H04N 7/14* (2006.01)
*G09G 5/377* (2006.01)
(Continued)

(52) U.S. Cl.
CPC ......... *G09G 5/377* (2013.01); *H04N 5/23216* (2013.01); *H04N 5/23293* (2013.01);
(Continued)

(58) Field of Classification Search
CPC combination set(s) only.
See application file for complete search history.

(56) References Cited

U.S. PATENT DOCUMENTS 7,583,316 B2   9/2009  Miyashita et al.
2004/0233215 A1* 11/2004  Dawson ................ G06T 15/503
                                                          345/592
(Continued)

FOREIGN PATENT DOCUMENTS

EP     1 441 522      7/2004
JP     2003-333556    11/2003
(Continued)

OTHER PUBLICATIONS

Korean Office Aciton dated Oct. 31, 2016 issued in counterpart application No. 10-2011-0036031, 10 pages.
(Continued)

*Primary Examiner* — Joseph J Nguyen
(74) *Attorney, Agent, or Firm* — The Farrell Law Firm, P.C.

(57) ABSTRACT

A method and apparatus for compositing images in a portable terminal are provided. The method includes acquiring a plurality of images, displaying a plurality of candidate composition regions in each of the plurality of images, selecting a composition region of each of the plurality of images based on a user input, and compositing the plurality of images by using the composition regions of the plurality of images.

18 Claims, 8 Drawing Sheets

(51) Int. Cl.
*H04N 5/232* (2006.01)
*G06F 3/14* (2006.01)

(52) U.S. Cl.
CPC ........... *H04N 7/147* (2013.01); *G06F 3/1454* (2013.01); *G09G 2340/0464* (2013.01); *G09G 2340/10* (2013.01); *G09G 2340/12* (2013.01); *H04N 2007/145* (2013.01)

(56) References Cited

U.S. PATENT DOCUMENTS

| | | |
|---|---|---|
| 2007/0200925 A1 | 8/2007 | Kim |
| 2008/0133640 A1* | 6/2008 | Saito ................ H04L 67/38 709/201 |
| 2010/0124941 A1 | 5/2010 | Cho |
| 2011/0058103 A1 | 3/2011 | Lin et al. |
| 2011/0090302 A1 | 4/2011 | Leviav et al. |
| 2011/0102671 A1* | 5/2011 | Tsai ................ H04N 21/4307 348/441 |
| 2011/0249076 A1 | 10/2011 | Zhou et al. |
| 2012/0013807 A1* | 1/2012 | Arora ................ H04N 5/268 348/705 |
| 2012/0092438 A1 | 4/2012 | Guzman Suarez et al. |
| 2012/0098922 A1* | 4/2012 | Pennington ............ H04N 7/148 348/14.08 |

FOREIGN PATENT DOCUMENTS

| | | |
|---|---|---|
| JP | 2005204015 | 7/2005 |
| JP | 2005223812 | 8/2005 |
| JP | 2009159525 | 7/2009 |
| KR | 1020060071697 | 6/2006 |
| KR | 1020070080401 | 8/2007 |
| KR | 1020070117284 | 12/2007 |
| KR | 1020090008732 | 1/2009 |
| KR | 20090033952 | 4/2009 |
| KR | 20090094793 | 9/2009 |
| KR | 1020100059493 | 6/2010 |
| KR | 1020100060176 | 6/2010 |
| WO | WO 2009/066910 | 5/2009 |

OTHER PUBLICATIONS

Korean Office Aciton dated Apr. 27, 2017 issued in counterpart application No. 10-2011-0036031, 3 pages.
Korean Office Aciton dated Aug. 18, 2017 issued in counterpart application No. 10-2017-0095554, 10 pages.

* cited by examiner

FIRST IMAGE　　　　　　SECOND IMAGE

FIRST IMAGE　　　　　　SECOND IMAGE

COMPOSED IMAGE

FIRST TERMINAL'S IMAGE

SECOND TERMINAL'S IMAGES

FIRST TERMINAL'S IMAGE

SECOND TERMINAL'S IMAGES

COMPOSED IMAGE

APPARATUS AND METHOD FOR COMPOSITING IMAGE IN A PORTABLE TERMINAL

PRIORITY

The present application is a continuation of U.S. application Ser. No. 13/450,054, which was filed in the U.S. Patent and Trademark Office on Apr. 18, 2012, and claims priority under 35 U.S.C. §119(a) to Korean Patent Application Serial No. 10-2011-0036031, which was filed in the Korean Intellectual Property Office on Apr. 19, 2011, the entire disclosure of each of which is hereby incorporated by reference.

BACKGROUND OF THE INVENTION

1. Field of the Invention

The present invention relates generally to image composition, and more particularly, to an apparatus and method for compositing images in a portable terminal.

2. Description of the Related Art

The use of portable terminals has recently increased. Accordingly, portable terminals have been equipped with various additional functions. Examples of such additional functions of the portable terminals include a gaming function, a scheduling function, a wake-up call function, a Moving Picture Experts Group (MPEG) layer 3 (MP3) function, a video player function, and a digital camera function.

Specifically, a digital camera function is included in most portable terminals. Aside from a simple photographing function, the digital camera function of the portable terminal provides a photographing function based on a background image. For example, the portable terminal provides a function for photographing a user image and compositing a prestored background image and the user image into one image.

As described above, the conventional portable terminal provides an image composition function to enable the user to acquire various images in addition to a simple image. However, the conventional image composition function composes a user image at a fixed position of the prestored background image, thus failing to satisfy the requirements of users.

SUMMARY OF THE INVENTION

An aspect of the present invention is to substantially solve at least the above problems and/or disadvantages and to provide at least the advantages below. Accordingly, an object of the present invention is to provide an apparatus and method for compositing images in a portable terminal.

Another aspect of the present invention is to provide an apparatus and method for compositing images acquired from a plurality of cameras, in a portable terminal.

Another aspect of the present invention is to provide an apparatus and method for determining a composition region for each of a plurality of images in a portable terminal and compositing the images by an alpha-blending technique.

Another aspect of the present invention is to provide an apparatus and method for sharing a plurality of images between a plurality of portable terminals and compositing the shared images.

Another aspect of the present invention is to provide a method and apparatus for compositing, by a portable terminal supporting a video call function, an image received from a video call counterpart terminal and an image input from a camera of the portable terminal, and displaying the image that was composed during the video call.

According to an aspect of the present invention, a method for compositing images in a portable terminal is provided. The method includes acquiring a plurality of images, displaying a plurality of candidate composition regions in each of the plurality of images, selecting a composition region of each of the plurality of images based on a user input, and compositing the plurality of images by using the composition regions of the plurality of images.

According to another aspect of the present invention, an apparatus for compositing images in a portable terminal is provided. The apparatus includes an image-acquiring unit for acquiring a plurality of images, a composition region-selecting unit for displaying a plurality of candidate composition regions in each of the plurality of images and selecting a composition region of each of the plurality of images based on a user input, and an image-compositing unit for compositing the plurality of images by using the composition regions of the images.

According to an aspect of the present invention, a method for compositing images in a portable terminal is provided. The method includes identifying a plurality of candidate composition regions of each of a plurality of images, displaying the plurality of candidate composition regions, selecting a composition region of each of the plurality of images based on a user input, and merging the selected composition region of each of the plurality of images into one image.

According to another aspect of the present invention, an apparatus for compositing images in a portable terminal is provided. The apparatus includes a composition region-selecting unit for identifying a plurality of candidate composition regions of each of a plurality of images, displaying the plurality of candidate composition regions and selecting a composition region of each of the plurality of images based on a user input, and an image-compositing unit for merging the selected composition region of each of the plurality of images into one image.

BRIEF DESCRIPTION OF THE DRAWINGS

The above and other aspects, objects, features and advantages of the present invention will become more apparent from the following detailed description when taken in conjunction with the accompanying drawings, in which.

DETAILED DESCRIPTION

Embodiments of the present invention will be described herein below with reference to the accompanying drawings. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein must be understood based on the descriptions made herein.

The present invention provides a method and apparatus for compositing images in a portable terminal.

Figure 1:
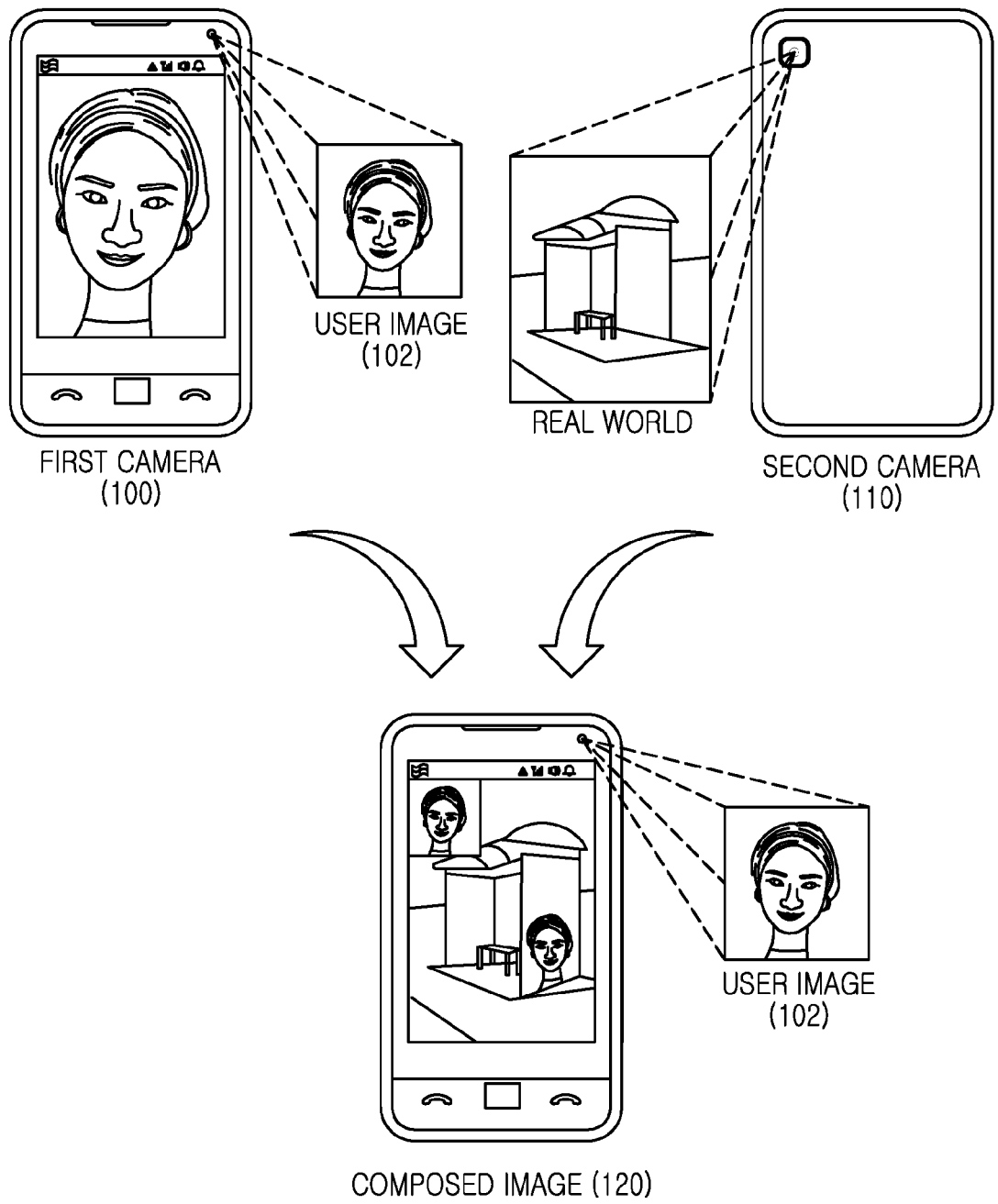
FIG. 1 is a diagram illustrating a method for compositing images in a portable terminal according to an embodiment of the present invention.

FIG. 1 is a diagram illustrating a method for compositing images in a portable terminal according to an embodiment of the present invention.

Referring to FIG. 1, a user image is acquired through a first camera 100, acquires a background image through a second camera 102, the user image and the background image are composed (merged) to form a composed (merged) image 120. The portable terminal determines a composition region of the user image and a composition region of the background image and composes the composition region of the user image and the composition region of the background image as if the user image was originally included in the background image. According to an embodiment, the first camera 100 may be a camera equipped at a front side of the portable terminal, and the second camera 102 may be a camera equipped at a rear side of the portable terminal. The camera equipped at the front side refers to a camera equipped at the side on which a display panel is provided to enable the user to view the composition results, and the camera at the rear side refers to a camera facing a different directions direction from the camera at the front side.

According to another embodiment, the first camera 100 and the second camera 102 are cameras on different portable terminals. Hereinafter, a description will be given of the composition of images acquired in real-time through the first camera 100 and the second camera 102. However, the images that to be composed may vary without departing from the scope of the present invention. For example, the present invention may also be applicable to the composition of a prestored image and at least one image acquired from the first camera 100 and the second camera 102, and to the composition of wholly prestored images. An image-compositing scheme according to the present invention may be applicable not only to the composition of still images, but also to the composition of video images and the composition of a video image and a still image.

The image-compositing scheme according to the present invention will be described below in detail with reference to FIGS. 2 and 7.

Figure 2:
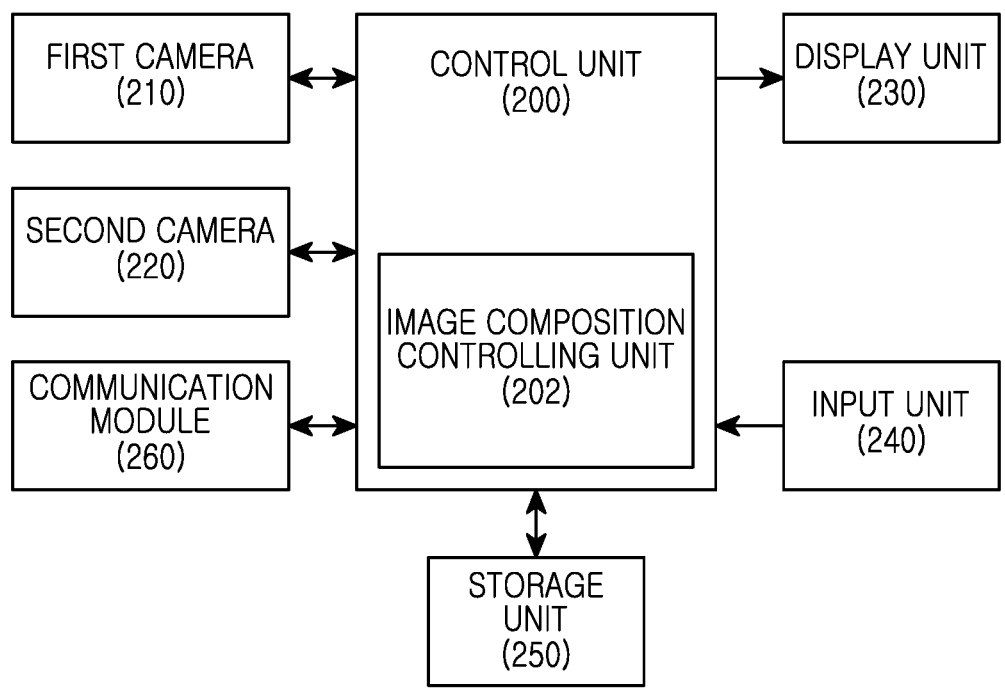
FIG. 2 is a block diagram illustrating a portable terminal according to an embodiment of the present invention.

FIG. 2 is a block diagram of a portable terminal, according to an embodiment of the present invention.

Referring to FIG. 2, a portable terminal according to an embodiment of the present invention includes a control unit 200, a first camera 210, a second camera 220, a display unit 230, an input unit 240, a storage unit 250, and a communication module 260. The control unit 200 includes an image composition-controlling unit 202.

The control unit 200 controls an overall operation of the portable terminal. According to an embodiment of the present invention, the control unit 200 includes the image composition-controlling unit 202 to compose at least two images acquired in real-time and display the composed image on the display unit 230. For example, the image composition-controlling unit 202 acquires two or more images in real-time, determines a composition region of each of the acquired images, and composes the images on the basis of the respective composition images of the images to acquire a composed image. Thereafter, the image composition-controlling unit 202 displays the composed image on the display unit 230.

Figure 3:
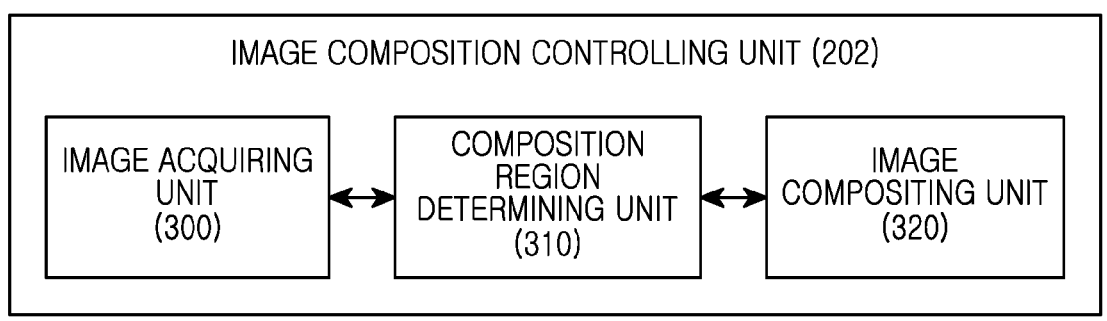
FIG. 3 is a block diagram illustrating an image composition-controlling unit in a portable terminal according to an embodiment of the present invention.

As illustrated in FIG. 3, the image composition-controlling unit 202 according to an embodiment includes an image-acquiring unit 300, a composition region-determining unit 310, and an image-compositing unit 320 to compose two or more images.

When an image composition event occurs in a standby mode state, the image-acquiring unit 300 operates the first camera 210 and the second camera 220 to acquire a user image from the first camera 210 and acquire a background image from the second camera 220. Moreover, when an image composition event occurs in a state of a video call with a counterpart terminal, the image-acquiring unit 300 operates at least one of the first camera 210 and the second camera 220 to acquire at least one image, and acquires an image that is received in real-time from the counterpart terminal performing the video call. The image-acquiring unit 300 may request that the user select a user image and a background image among the images acquired from the first camera 210, the second camera 220 and the counterpart terminal. For the sake of convenience, a description will be given of the case in which the image-acquiring unit 300 acquires a user image from the first camera 210 and uses an image, received in real-time, from the counterpart terminal, as a background image. However, the present invention may also be applicable to other cases. For example, according to the user's settings, both the images received in real-time from the first camera 210 and the counterpart terminal may be used as user images, and the image acquired from the second camera 220 may be used as a background image.

The composition region-determining unit 310 determines a composition region of the user image and the background image acquired by the image-acquiring unit 300. The composition region-determining unit 310 analyzes the user image and the background image, detects a candidate composition region of each image, and displays the candidate composition region of each image on a screen. The composition region-determining unit 310 detects the candidate composition region of each image by the known image recognition techniques such as a face detection technique and a Region-Of-Interest (ROI) analysis technique. The composition region-determining unit 310 determines the detected candidate composition region as the composition region of each image without a user input, or may determine the detected candidate composition region as the composition region of each image according to a user input. If there is a plurality of candidate composition regions in one image, the composition region-determining unit 310 determines a random candidate composition region as the composition region, or may determine the candidate composition region with the highest priority as the composition region by using a predetermined method. Further, the composition region-determining unit 310 may display all the candidate composition regions on the screen, request the user to select one of the candidate composition regions, and determine the selected candidate composition region as the composition region.

Moreover, the composition region-determining unit 310 requests that the user select the composition region of each image, and detects a user input to determine the composition region. For example, if a user's touch has the shape of a closed curve, a region within the closed curve may be selected as the composition region; and if a user's touch indicates specific coordinates, a peripheral region around the specific coordinates may be selected as the composition region. Selecting of the composition region on the basis of the specific coordinates indicated by the touch of the user includes determining the peripheral region in the image, which is similar to the specific coordinates in color value, as the composition region. When the composition region of the background image and the composition region of the user image are determined, the composition region-determining unit 310 compares the shapes of the two composition regions to determine whether the two composition regions can be composed together. If the two composition regions cannot be composed because they have different shapes, the composition region-determining unit 310 adjusts the two composition regions so that they have the same shape. Moreover, the composition region of the background image of the counterpart terminal may be preset in the counterpart terminal according to a design mode. Thus, the portable terminal may receive information about the preset composition region together with the background image from the counterpart terminal.

The image-compositing unit 320 composes the user image and the background image on the basis of the composition regions determined by the composition region-determining unit 310. The image-compositing unit 320 composes the user image and the background image by covering the composition region of the background image with the composition region of the user image. Herein, the image-compositing unit 320 performs an alpha-blending operation to cover the composition region of the background image with the composition region of the user image.

When combining a background image with a user image, in order for the background image to be seen transparently through the user image, the alpha-blending operation allocates a new 8-bit alpha value to each pixel and blends the Red Green Blue (RGB) values of the background image and the RGB values of the user image. If the size of the composition region of the background image is not equal to the size of the composition region of the user image, the image-compositing unit 320 scales the composition region of the user image up or down to equalize the sizes of the two composition regions, and then performs an alpha-blending operation. Further, if the image composition is performed on video images, the image-compositing unit 320 composes the respective image frames constituting the video images. The image-compositing unit 320 thus tracks the composition region to compose two image frames. For example, if image composition is performed during the video call, the image-compositing unit 320 tracks the position of the composition region in each of the images received in real-time from the counterpart terminal and the camera of the portable terminal, and performs the image composition according to the changed position. Furthermore, after compositing the composition regions of the two images, the image-compositing unit 320 blurs the edges of the composition region so that they look natural. Blurring changes the pixel values around the edge pixels into the average value to soften the image.

The first camera 210 is at a front side of the portable terminal. Under the control of the control unit 200, the first camera 210 converts an analog video signal, input through a sensor (not illustrated), into a digital video signal and provides the same to the control unit 200. The first camera 210 may be used to perform a video call function or a self-photo function.

The second camera 220 is at a rear side of the portable terminal. Under the control of the control unit 200, the second camera 220 converts an analog video signal, input through a sensor (not illustrated), into a digital video signal and provides the same to the control unit 200. The second camera 220 photographs a direction other than the direction photographed by the first camera 220, and provides the photographing results to the control unit 200.

The display unit 230 displays numerals, characters, images, and status information generated during an operation of the portable terminal. According to an embodiment, the display unit 230 displays a user image and a background image on one screen, and displays a determined composition region or a candidate composition region of each user image and background image. Further, the display unit 230 displays a composed image received from the control unit 200.

The input unit 240 includes at least one function key and a touch sensor. The input unit 240 provides the control unit 200 with data corresponding to a key stroked by the user or coordinate data corresponding to a touchpoint. The input unit 240 detects a touch or a user's keystroke for setting the composition region and provides the corresponding data to the control unit 200.

The storage unit 250 stores various data and programs for the overall operation of the portable terminal. The storage unit 250 stores a photographed image. Under the control of the control unit 200, the storage unit 250 stores one composition frame or consecutive composition image frames. The consecutive composition image frames may be stored in the shape of a video image.

The communication module 260 communicates signals with a counterpart terminal through a wired or wireless channel under the control of the control unit 200. According to an embodiment of the present invention, the communication module 260 communicates signals for a video call and communicates images with the counterpart terminal during the video call. The communication module 260 may transmit an image composed in real-time to the counterpart terminal, under the control of the control unit 200.

A description has been given of the case where the portable terminal has two cameras. However, even when the portable terminal only has one camera, an image composition function may be performed using a prestored image or an image received from another portable terminal.

Figure 4:
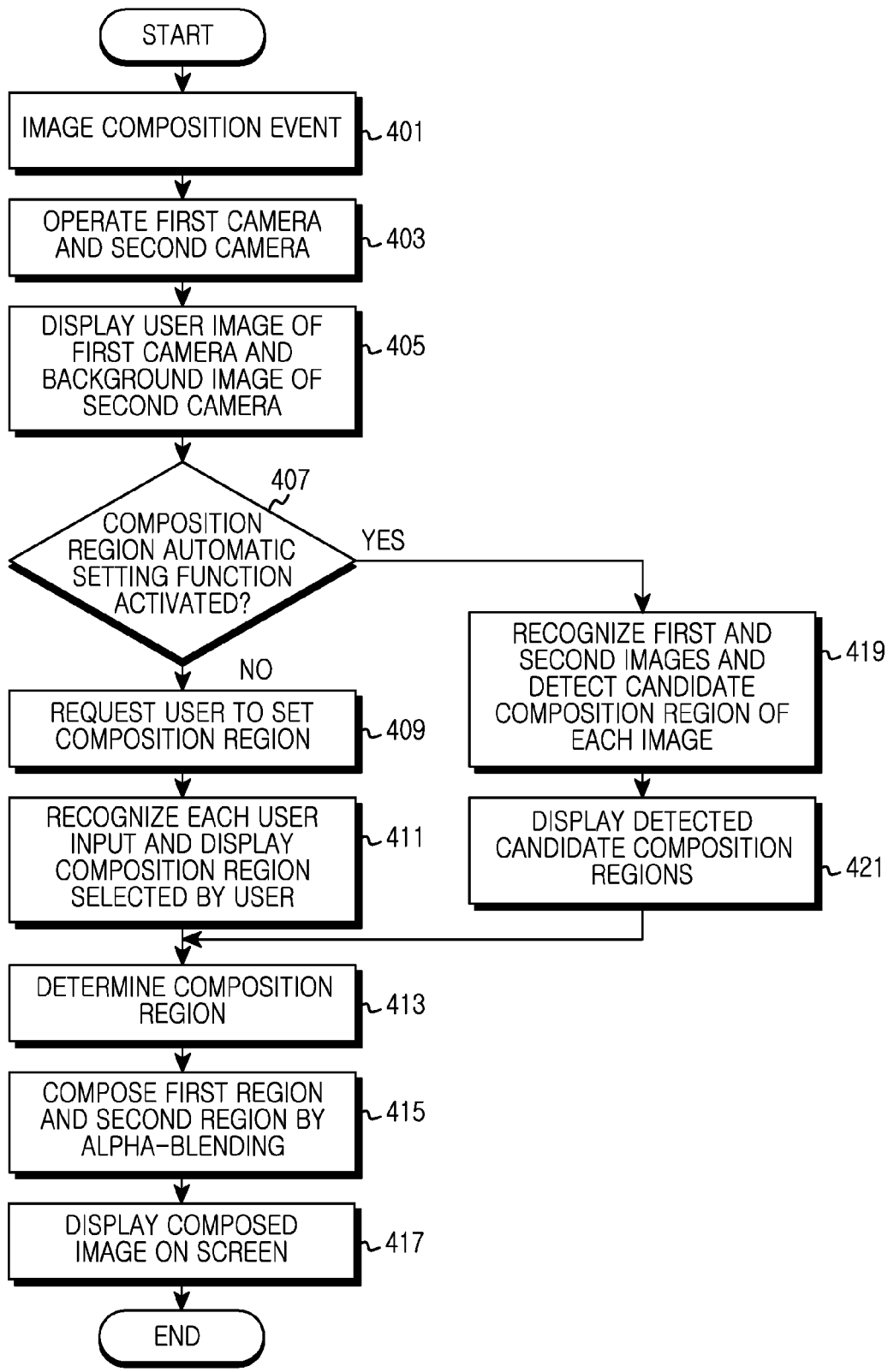
FIG. 4 is a flowchart illustrating a process of compositing images in a portable terminal according to an embodiment of the present invention.

FIG. 4 is a flowchart illustrating a process of compositing images in a portable terminal according to an embodiment of the present invention.

Referring to FIG. 4, when an image composition event occurs in step 401, the portable terminal operates a first camera and a second camera of the portable terminal in step 405. In step 405, the portable terminal displays a user image, input from the first camera, and a background image, input from the second camera, on a screen.

In step 407, the portable terminal determines whether a composition region automatic setting function is activated. The composition region automatic setting function is activated or deactivated by a user.

If the composition region automatic setting function is deactivated, the portable terminal proceeds to step 409. In step 409, the portable terminal requests that the user select composition regions. In step 411, the portable terminal recognizes a user input and displays the selected compose region of the user image and the selected composition region of the background image on the display. The portable terminal thus recognizes the composition region selected by the user, from a keystroke or a key touch of the user.

However, if the composition region automatic setting function is activated, the portable terminal proceeds to step 419, in which the portable terminal recognizes the user image and the background image and detects a candidate composition region of each image. In step 421, the portable terminal displays the detected candidate composition region on the screen. The portable terminal detects the candidate composition region of each image by the known image recognition techniques such as a face detection technique and an ROI analysis technique. If there is a plurality of candidate composition regions in each image, the portable terminal displays only one candidate composition region using a predetermined method, or displays all the candidate composition regions and request that the user select one of the candidate composition regions.

In step 413, the portable terminal determines the composition region of the user image and the composition region of the background image. In step 415, the portable terminal composes the composition region of the user image and the composition region of the background image by an alpha-blending operation. The two images are composed by the alpha-blending operation, thereby maintaining the texture of the composition region of the background image as if the user image was originally included in the background image. Also, if the size of the composition region of the background image is not equal to the size of the composition region of the user image, the portable terminal scales the composition region of the user image up or down to equalize the sizes of the two composition regions, and then perform the alpha-blending operation.

In step 417, the portable terminal displays the composed image on the screen. The portable terminal then ends the process.

Figure 5:
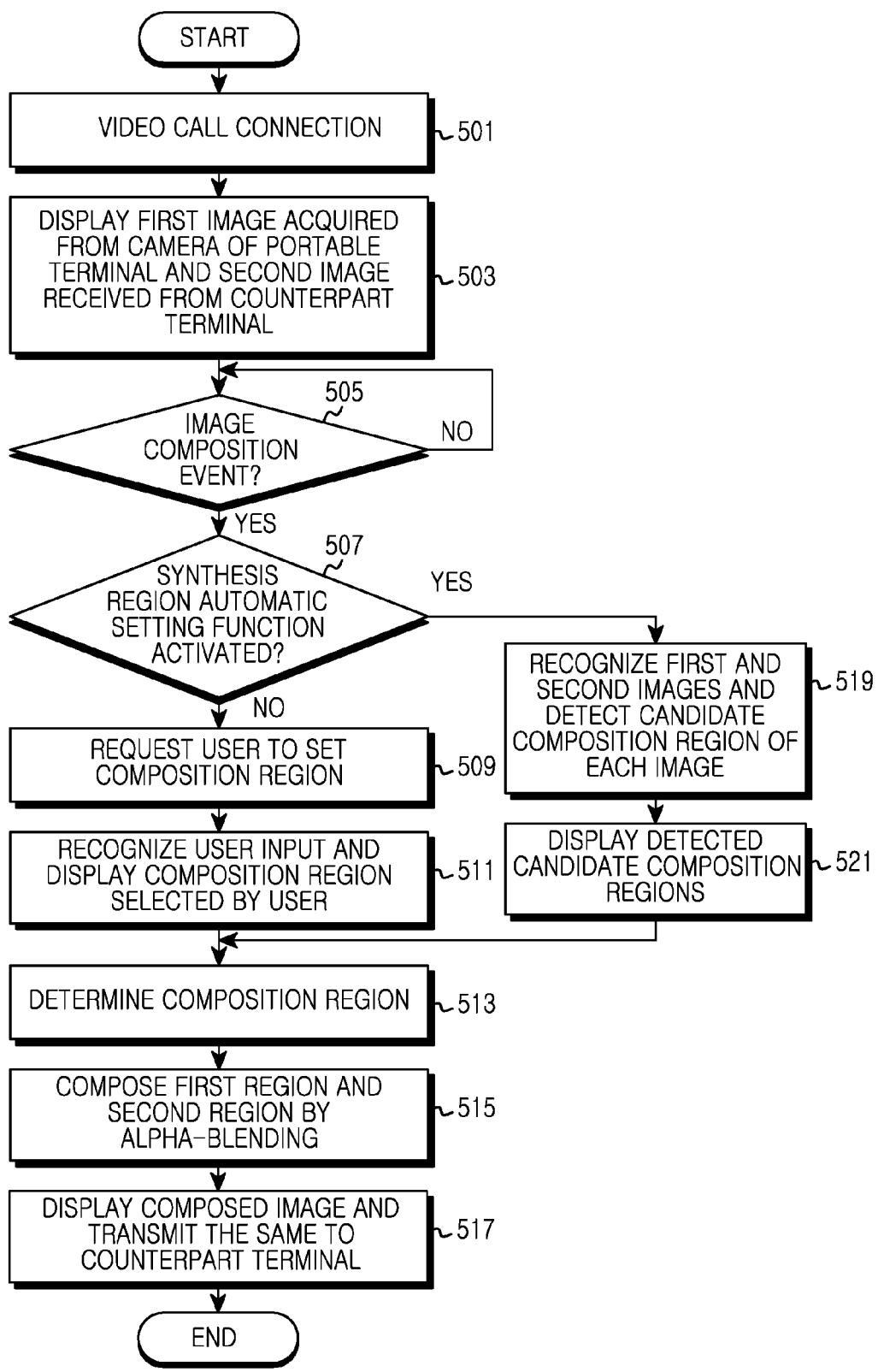
FIG. 5 is a flowchart illustrating a process of compositing images during a video call in a portable terminal according to another embodiment of the present invention.

FIG. 5 is a flowchart illustrating a process of compositing images during a video call in a portable terminal according to another embodiment of the present invention.

Referring to FIG. 5, a video call is connected in step 501. In step 503, the portable terminal displays a first image acquired from its own camera and a second image received from a counterpart terminal of the video call.

In step 505, the portable terminal determines whether an image composition event occurs.

If an image composition event occurs, the portable terminal proceeds to step 507. In step 507, the portable terminal determines whether a composition region automatic setting function is activated. The composition region automatic setting function may be activated or deactivated by a user.

If the composition region automatic setting function is deactivated, the portable terminal proceeds to step 509, in which the portable terminal requests that the user select composition regions. In step 511, the portable terminal recognizes a user input and displays the selected compose region of the first image and the selected composition region of the second image on the display. The portable terminal then recognizes the composition region selected by the user, from a keystroke or a key touch of the user.

However, if the composition region automatic setting function is activated, the portable terminal proceeds to step 519, in which the portable terminal recognizes the first image and the second image and detects a candidate composition region of each image. In step 521, the portable terminal displays the detected candidate composition region on the screen. The portable terminal detects the candidate composition region of each image by the known image recognition techniques such as a face detection technique and an ROI analysis technique. If there is a plurality of candidate composition regions in each image, the portable terminal displays only one candidate composition region in a predetermined way, or displays all the candidate composition regions and request that the user select one of the candidate composition regions.

In step 513, the portable terminal determines the composition region of the first image and the composition region of the second image. In step 515, the portable terminal composes the composition region of the first image and the composition region of the second image by an alpha-blending operation. The portable terminal requests that the user select the first or second image to be the background image. If the first image is a user image and the second image is a background image, the two images are composed by covering the composition region of the first image with the composition region of the second image. The two images are composed by the alpha-blending operation, thereby maintaining the texture of the composition region of the background image as if the user image were originally included in the background image. Because data of the first image photographed by the portable terminal and data of the second image photographed by the counterpart terminal may change due to a movement of the terminal during the video call, the portable terminal tracks the position of the composition region of each image frame input in real-time and compose the images by using the tracked composition regions. Further, if the size of the composition region of the background image is not equal to the size of the composition region of the user image, the portable terminal scales the composition region of the user image up or down to equalize the sizes of the two composition regions, and then perform an alpha-blending operation.

In step 517, the portable terminal displays the composed image on the screen and transmits the composed image to the counterpart terminal. The portable terminal may not transmit the composed image to the counterpart terminal according to another embodiment of the present invention.

Figure 6A:
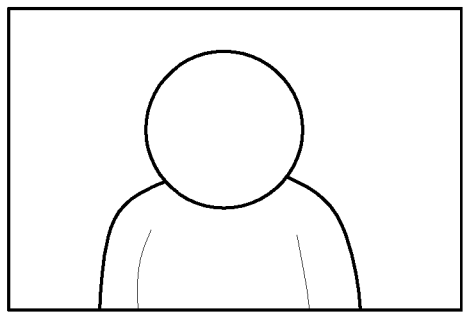
FIGS. 6A to 6C are diagrams illustrating a screen configuration for an image compositing method in a portable terminal according to an embodiment of the present invention.
Figure 6A:
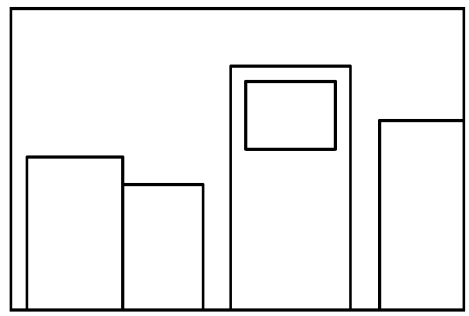
Figure 6B:
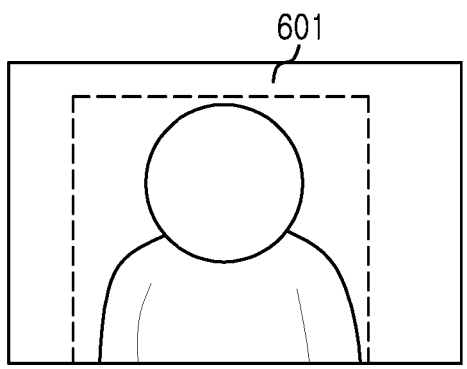
Figure 6B:
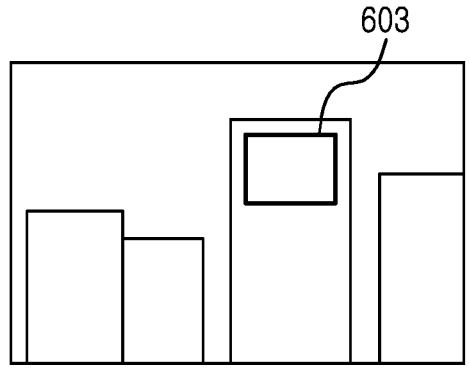
Figure 6C:
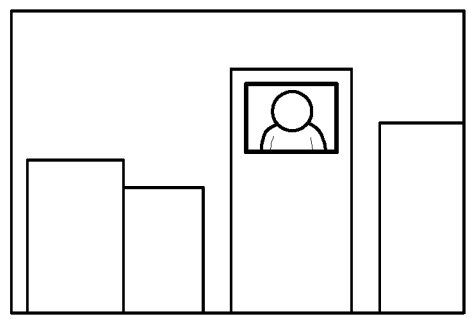

FIGS. 6A to 6C are diagrams illustrating a screen configuration for an image compositing method in a portable terminal according to an embodiment of the present invention. It is assumed that a portable terminal acquires two images and composes the two images to create a composed image. As illustrated in FIG. 6A, a portable terminal acquires a first image including a user image and a second image including images of buildings. As illustrated in FIG. 6B, the portable terminal selects a region including the user image in the first image as a compose region 601 and selects a billboard region of the building in the second image as a second composition region 603. As illustrated in FIG. 6C, the portable terminal synchronizes the billboard region of the second image and the region including the user image. Accordingly, the portable terminal provides a composed image as if the user was an advertising model for billboard. This operation may also be applicable to the case in which the two images are a still image and a video image. However, if at least one of the two images is a video image, it may be necessary to track a changed portion of the composition region of the video image.

Figure 7A:
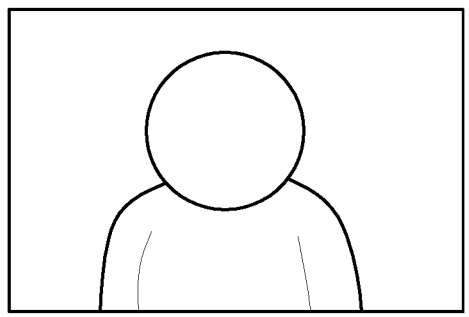
FIGS. 7A to 7C are diagrams illustrating a screen configuration for an image compositing method in a portable terminal according to another embodiment of the present invention.
Figure 7A:
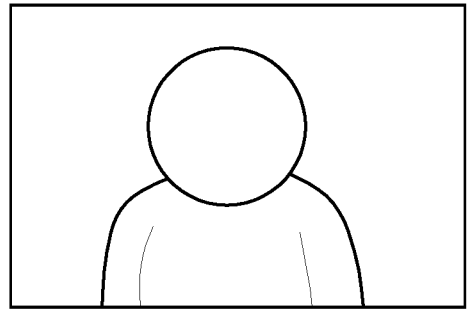
Figure 7A:
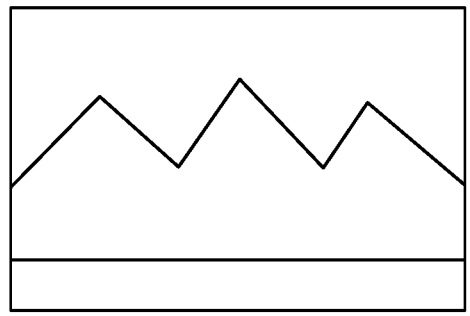
Figure 7B:
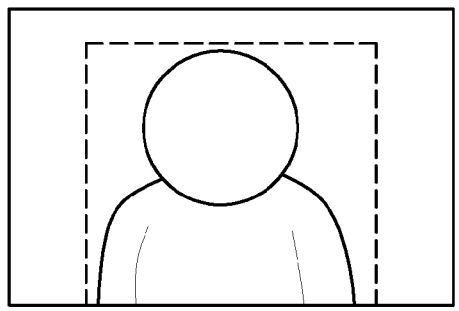
Figure 7B:
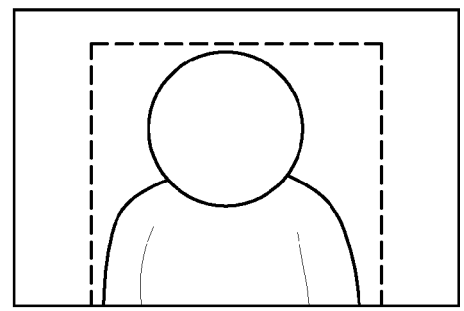
Figure 7B:
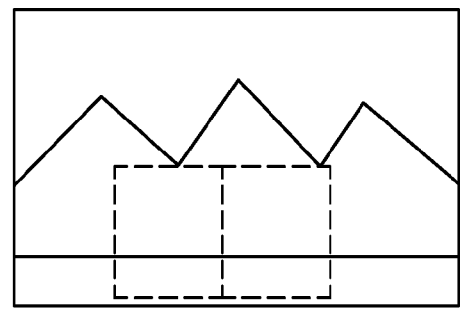
Figure 7C:
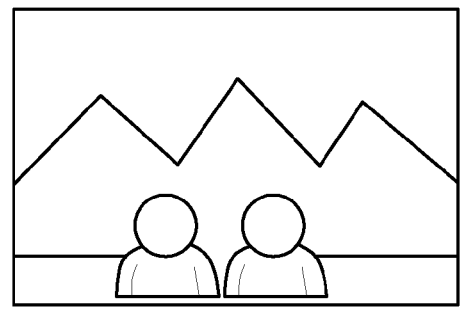

FIGS. 7A to 7C are diagrams illustrating a screen configuration for an image compositing method in a portable terminal according to another embodiment of the present invention. It is assumed that a portable terminal acquires an image, another portable terminal acquires two images, and the portable terminal composes the three images to form a composed image. As illustrated in FIG. 7A, according to another embodiment of the present invention, the first terminal acquires a first image including a user image and the second terminal acquires a second image including a user image and a third image including a natural scene image. As illustrated in FIG. 7B, after sending acquired images to one another, the first terminal and the second terminal selects a region including a user image in the first image as a compose region, selects a region including a user image in the second image as a compose region, and selects a region in the third region as a composition region. The compose region of each image may be selected in the portable terminal and then transmitted to the counterpart terminal. Information about the composition region may also be transmitted to the counterpart terminal, together with the image.

As illustrated in FIG. 7C, the first terminal and the second terminal compose the composition region of the third image and the composition regions of the first and second images, thereby providing a composed image as if the user of the first terminal and the user of the second terminal were photographed together with the natural scene as the background. This operation may also be applicable to the case in which the three images are a still image and a video image. However, if at least one of the three images is a video image, it may be necessary to track a changed portion of the composition region of the video image.

Although a description has been given of the case where images are shared between portable terminals during a video call and the shared images are composed together, the image composition scheme may also be applicable to the case in which images are shared between terminals that do not support a video call function. For example, if an image is transmitted from a TeleVision (TV), a Personal Computer (PC) or a video player to a portable terminal through a wireless or wired channel, the portable terminal may compose the image and an image photographed by its camera according to the present invention.

As described above, the present invention composes images in real-time, photographed by the front camera and the rear camera of a portable terminal, thereby acquiring a variety of composed images based on desired backgrounds of the user. Further, the portable terminal receives an image photographed by another portable terminal and composes the received image and an image photographed by the portable terminal itself, thereby forming a composed image as if the user visited an area that was not actually visited by the user, and forming a composed image as if the user of the portable terminal was photographed together with the user of another portable terminal. Moreover, the images are composed by an alpha-blending technique, thereby creating a more realistic composed image.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. An apparatus for compositing images in a portable terminal, the apparatus comprising:
   a first camera;
   a second camera;
   a memory;
   an input unit configured to receive inputs;
   a display unit configured to display images on a screen; and
   a processor configured to:
      control the first camera to receive a first image,
      control the second camera to receive a second image,
      control the display unit to display the first image on the screen,
      control the input unit to receive a first input for selecting a composition region on the first image, wherein the composition region is a region on the first image where the second image is to be displayed;
      in response to receiving the first input for selecting the composition region, control the display unit to display the second image at the selected composition region of the first image,
      change a position of the selected composition region, which displays the second image, on the first image,
      control the display unit to display the second image on the changed position of the selected composition region on first image, and
      control to composite the second image on the first image at the changed position by an alpha-blending technique and store the composited first image and second image as a third image to the memory, wherein the composition region of the first image is to be used as a background of the second image.

2. The apparatus of claim 1, wherein the first input is a user input to touch on the display unit.

3. The apparatus of claim 1, wherein the first camera is facing a different direction from the second camera.

4. The apparatus of claim 3, wherein the first camera is equipped at a rear side of the portable terminal, and the second camera is equipped at a front side of the portable terminal.

5. The apparatus of claim 1, wherein the first image is acquired as a background image through the first camera.

6. The apparatus of claim 1, wherein the processor is further configured to composite the first image and the second image into one image in response to a second input.

7. The apparatus of claim 1, wherein the processor is further configured to:
   control the display unit to display a plurality of candidate composition regions on the first image, wherein the plurality of candidate composition regions are regions of the first image where the second image is capable of being displayed; and
   control the input unit to receive the first input for selecting the composition region from among the displayed plurality of candidate composition regions.

8. The apparatus of claim 1, wherein the processor is further configured to:
   automatically identify one or more candidate composition regions of the first image;
   when one candidate composition region is identified in the first image, select the identified candidate composition region as the composition region; and
   when a plurality of candidate composition regions are identified in the first image, select one of the identified candidate composition regions as the composition region in a predetermined manner.

9. The apparatus of claim 1, wherein the processor is further configured to change the position of the selected composition region by tracking a position of the selected composition region of the first image to compose the second image during a video call.

10. A method for compositing images in a portable terminal having a first camera and a second camera, the method comprising:
    receiving a first image from the first camera;
    receiving a second image from the second camera;
    displaying the first image on a screen of the portable terminal;
    receiving a first input for selecting a composition region on the first image, wherein the composition region is a region on the first image where the second image is to be displayed;
    in response to receiving the first input for selecting the composition region, displaying the second image at the selected composition region of the first image on the screen;
    changing a position of the selected composition region, which displays the second image, on the first image;
    displaying the second image on the changed position of the selected composition region on the first image; and
    compositing the second image on the first image at the changed position by an alpha-blending technique and storing the composited first image and second image as a third image to a memory of the portable terminal, wherein the composition region of the first image is to be used as a background of the second image.

11. The method of claim 10, wherein the first input is a user input to touch on a display unit of the portable terminal.

12. The method of claim 10, wherein the first camera is facing a different direction from the second camera.

13. The method of claim 12, wherein the first camera is equipped at a rear side of the portable terminal, and the second camera is equipped at a front side of the portable terminal.

14. The method of claim 10, wherein the first image is acquired as a background image through the first camera.

15. The method of claim 10, further comprising:
    displaying a plurality of candidate composition regions on the first image, wherein the plurality of candidate composition regions are regions of the first image where the second image is capable of being displayed; and
    receiving the first input for selecting the composition region from among the displayed plurality of candidate composition regions.

16. The method of claim 10, further comprising:
    automatically identifying one or more candidate composition regions of the first image;
    when one candidate composition region is identified in the first image, selecting the identified candidate composition region as the composition region; and
    when a plurality of candidate composition regions are identified in the first image, selecting one of the identified candidate composition regions as the composition region in a predetermined manner.

17. The method of claim 10, wherein changing the position of the selected composition region comprises tracking a position of the selected composition region of the first image to compose the second image during a video call.

18. A non-transitory computer readable recording medium that includes a program for implementing operations, the operations comprising:
    receiving a first image from the first camera of a portable terminal;
    receiving a second image from the second camera of the portable terminal;
    displaying the first image on a screen of the portable terminal;
    receiving a first input for selecting a composition region on the first image, wherein the composition region is a region on the first image where the second image is to be displayed;
    in response to receiving the first input for selecting the composition region, displaying the second image at the selected composition region of the first image on the screen;
    changing a position of the selected composition region, which displays the second image, on the first image;
    displaying the second image on the changed position of the selected composition region on the first image; and
    compositing the second image on the first image at the changed position by an alpha-blending technique and storing the composited first image and second image as a third image to a memory of the portable terminal, wherein the composition region of the first image is to be used as a background of the second image.

* * * * *